US010657753B2

(12) United States Patent
Suthar

(10) Patent No.: US 10,657,753 B2
(45) Date of Patent: *May 19, 2020

(54) SOFT TOUCH RESIN AND TRANSACTION CARD COMPRISING THE SAME

(71) Applicant: Capital One Services, LLC, McLean, VA (US)

(72) Inventor: Om J Suthar, Brambleton, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/406,525

(22) Filed: May 8, 2019

(65) Prior Publication Data
US 2019/0266830 A1   Aug. 29, 2019

Related U.S. Application Data

(63) Continuation of application No. 16/149,481, filed on Oct. 2, 2018, now Pat. No. 10,325,438, which is a (Continued)

(51) Int. Cl.
G07F 7/00 (2006.01)
G07F 7/08 (2006.01)
(Continued)

(52) U.S. Cl.
CPC ........... G07F 7/0806 (2013.01); B42D 25/29 (2014.10); B42D 25/40 (2014.10); G06K 19/0772 (2013.01); G06K 19/07724 (2013.01); B29K 2995/0073 (2013.01); B32B 2274/00 (2013.01); B32B 2425/00 (2013.01); C08K 2201/009 (2013.01); C08L 2207/04 (2013.01); G06Q 20/357 (2013.01)

(58) Field of Classification Search
CPC ....... G07F 7/0806; B42D 25/29; B42D 25/40; G06K 19/0772; G06K 19/07724
USPC ...................................................... 235/380
See application file for complete search history.

(56) References Cited

U.S. PATENT DOCUMENTS 4,701,236 A   10/1987  Vielledent
4,774,633 A    9/1988  Dehaine
(Continued)

FOREIGN PATENT DOCUMENTS

EP   3293675 A2    3/2018
WO   WO 0113320 A2  2/2001
WO   WO 0113320 A3  2/2001

OTHER PUBLICATIONS

European Search Report for European Patent Application No. EP 17206260; dated Apr. 5, 2018; pp. 1-6.
(Continued)

Primary Examiner — Daniel A Hess
(74) Attorney, Agent, or Firm — Finnegan, Henderson, Farabow, Garrett & Dunner, LLP

(57) ABSTRACT

Apparatuses and methods are provided for manufacturing a transaction card. The disclosed apparatuses and methods may be used to form a transaction card frame configured to house a data storage component. The card frame may be formed of a resin mixture comprising a thermoplastic elastomer (TPE). The card frame may also have a Shore D hardness in the range of 20-80.

20 Claims, 5 Drawing Sheets

Related U.S. Application Data continuation of application No. 15/958,876, filed on Apr. 20, 2018, now Pat. No. 10,325,437, which is a continuation of application No. 15/720,527, filed on Sep. 29, 2017, now Pat. No. 9,997,005, which is a continuation of application No. 15/720,061, filed on Sep. 29, 2017, now Pat. No. 10,121,305.

(60) Provisional application No. 62/432,094, filed on Dec. 9, 2016.

(51) Int. Cl.
*G06K 19/077* (2006.01)
*B42D 25/29* (2014.01)
*B42D 25/40* (2014.01)
*G06Q 20/34* (2012.01)

(56) References Cited

U.S. PATENT DOCUMENTS

| | | | |
|---|---|---|---|
| 4,990,759 A | 2/1991 | Gloton | |
| 9,997,005 B1 * | 6/2018 | Suthar | G07F 7/0806 |
| 10,121,305 B2 * | 11/2018 | Suthar | G06K 19/0772 |
| 10,325,437 B2 * | 6/2019 | Suthar | B42D 25/29 |
| 10,325,438 B2 * | 6/2019 | Suthar | G06K 19/07724 |
| 2002/0005888 A1 * | 1/2002 | Obata | G03G 5/02 347/139 |
| 2007/0034999 A1 | 2/2007 | Stampka | |
| 2007/0200215 A1 | 8/2007 | Janke | |
| 2009/0200650 A1 | 8/2009 | Tan | |
| 2013/0075469 A1 * | 3/2013 | Stochita | G06K 19/07 235/380 |
| 2016/0004948 A1 | 1/2016 | Goetz | |
| 2017/0270398 A1 | 9/2017 | Mathieu | |
| 2018/0039874 A1 * | 2/2018 | Fischer | G06K 19/07309 |

OTHER PUBLICATIONS

First Action Interview Pilot Program Pre-Interview Communication for U.S. Appl. No. 15/720,527; dated Dec. 26, 2017; pp. 1-5.
First Action Interview Pilot Program Pre-Interview Communication for U.S. Appl. No. 15/720,061; dated Mar. 1, 2018; pp. 1-3.

* cited by examiner

SOFT TOUCH RESIN AND TRANSACTION CARD COMPRISING THE SAME

CROSS-REFERENCE TO RELATED APPLICATIONS

This application is a continuation of U.S. application Ser. No. 16/149,481, filed Oct. 2, 2018, which is a continuation of U.S. application Ser. No. 15/958,876, filed Apr. 20, 2018, which is a continuation of U.S. application Ser. No. 15/720,527, filed Sep. 29, 2017 (now U.S. Pat. No. 9,997,005), which is a continuation of U.S. application Ser. No. 15/720,061, filed Sep. 29, 2017 (now U.S. Pat. No. 10,121,305), and claims priority to U.S. Provisional Patent Application No. 62/432,094, filed Dec. 9, 2016. The contents of which each of the above-mentioned applications are hereby incorporated in their entireties.

TECHNICAL FIELD

The disclosed embodiments generally relate to transaction cards, and particularly, to transaction cards comprising a soft touch resin.

BACKGROUND

Transaction cards, such as credit and debit cards, have increasingly become a primary means for customers to complete financial transactions. Typically, transaction cards are cut from laminated sheets of polyvinyl chloride (PVC) or polycarbonate (PC), or other similar materials. After the overall shape of the card is formed, the card may be modified to add functional and/or visual features. For example, a magnetic strip and/or microchip may be affixed to one side, the card may be stamped with the card number and customer name, and color or a design may be added for appearance.

In addition, as transaction cards increase in prevalence, expectations for transaction card quality have increased. Transaction cards have increasingly been made to meet higher standards regarding materials, durability, and overall "fit and finish." Recently, heightened expectations of how a transaction card "feels" in a customer's hand, including aspects of tactile response and substance (i.e., weight) have garnered the attention of card manufacturers. One particular goal of card manufacturers is to deliver cards that have a "soft touch" feel. A "soft touch" feel may be described as a haptic sensation that occurs when a person touches something that, for example, feels soft, smooth, plush, and/or satiny.

Because PVC and PC transaction cards do not naturally provide a soft touch feeling, attempts to create a soft touch feel on PVC and PC transaction cards have been made using special coatings or coating additives. For example, soft touch coatings comprising polyurethane have been developed, which can be sprayed over a transaction card to deliver a soft touch feeling. Polyurethane additives have also been developed, which can be added to paints and protective coatings to provide a soft touch feel.

However, known specialized soft touch coatings and coatings modified with soft touch additives do not meet manufacturers' standards of durability for use with transaction cards. That is, such coatings can wear out or the soft touch feel can be lost well in advance of the service life of the transaction card. The application of soft touch coatings also introduces additional steps in the manufacturing process, which can decrease throughput and increase manufacturing costs. Further, the application of additional layers to a transaction card can increase the overall thickness of the card and affect card performance over the life of the card.

The present disclosure is directed to overcoming one or more of the problems set forth above and/or other problems associated with conventional transaction cards.

SUMMARY

The disclosed embodiments include a transaction card. The transaction card can comprise a card frame that can be configured to house a data storage component. In some aspects, the card frame may have a Shore D hardness in the range of 20-80. In other aspects, the card frame may have a Shore D hardness in the range of 40-60.

The card frame can be formed of a resin mixture, and the resin mixture can comprise a thermoplastic elastomer (TPE). The TPE can be a polyester elastomer. The resin mixture can further comprise an acetal homopolymer or polybutylene terephthalate (PBT). The TPE can have a flexure modulus in the range of 500-1150 MPa. The TPE can further have a Shore A hardness greater than 15 and a Shore D hardness less than 85. In other aspects, the TPE can have a Shore D hardness in the range of 70-85. The acetal homopolymer can have a Rockwell M hardness in the range of 18-94 and a Rockwell R hardness in the range of 102-122. The PBT can have a flexural modulus in the range of 1600-8500 MPa and a flexural strength in the range of 50-200 MPa.

In some aspects, the card frame of the transaction card can further be configured to house a transaction component. The card frame can, also, comprise a pocket. The pocket can comprise a first surface, a second surface, and a third surface. The second surface can be recessed a first depth from the first surface of the card frame, and the third surface can be recessed a second depth from the first surface of the card frame. The second depth may be greater than the first depth. In some aspects, the third surface can form a base portion of the pocket. The first depth can be 0.21 mm with an error tolerance of ±0.02 mm, and the second depth can be 0.62 mm with an error tolerance of ±0.02 mm. In some aspects, the second surface can be configured to house a contact plate of the transaction component, and the third surface can be configured to house the transaction component.

The transaction component can be a microchip or a communication device. In some aspects, the transaction component can comprise a Near Field Communication (NFC) device, an antenna, a Bluetooth® device, or a WiFi device.

Consistent with another disclosed embodiment, a method of manufacturing a transaction card is provided. The method may include providing a resin mixture comprising a TPE. The method may further include forming a card frame from the resin mixture, wherein the card frame is configured to house a data storage component. The card frame may have a Shore D hardness in the range of 20-80.

The TPE can be a polyester elastomer. The resin mixture can further comprise an acetal homopolymer or polybutylene terephthalate (PBT). The TPE can have a flexure modulus in the range of 500-1150 MPa. The TPE can further have a Shore A hardness greater than 15 and a Shore D hardness less than 85. In other aspects, the TPE can have a Shore D hardness in the range of 70-85. The acetal homopolymer can have a Rockwell M hardness in the range of 18-94 and a Rockwell R hardness in the range of 102-122. The PBT can have a flexural modulus in the range of 1600-8500 MPa and a flexural strength in the range of 50-200 MPa.

In some aspects, the method can further include providing a mold comprising a first plate configured to form the card frame. The method can further include forming a pocket on the card frame to house the transaction component. The pocket can comprise a first surface, a second surface, and a third surface. The second surface can be recessed a first depth from the first surface of the card frame, and the third surface can be recessed a second depth from the first surface of the card frame. The second depth may be greater than the first depth. In some aspects, the third surface can form a base portion of the pocket. The first depth can be 0.21 mm with an error tolerance of ±0.02 mm, and the second depth can be 0.62 mm with an error tolerance of ±0.02 mm. In some aspects, the second surface can be configured to house a contact plate of the transaction component, and the third surface can be configured to house the transaction component.

The method can further include providing a transaction component that can be a microchip or a communication device. In some aspects, the transaction component can comprise a Near Field Communication (NFC) device, an antenna, a Bluetooth® device, or a WiFi device.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Reference will now be made in detail to the disclosed embodiments, examples of which are illustrated in the accompanying drawings. Wherever convenient, the same reference numbers will be used throughout the drawings to refer to the same or like parts.

Disclosed embodiments include transaction cards and methods for manufacturing a transaction card. For example, disclosed embodiments include a transaction card having a card frame configured to house a data storage component, wherein the card frame is formed of a resin mixture comprising a thermoplastic elastomer (TPE), and the card frame has a Shore D hardness in the range of 20-80. Disclosed embodiments also include a method of manufacturing a transaction card including the steps of providing a resin mixture comprising a thermoplastic elastomer (TPE) and forming a card frame from the resin mixture, wherein the card frame is configured to house a data storage component, wherein the card frame has a Shore D hardness in the range of 20-80. Disclosed embodiments may improve transaction card performance and durability, and reduce costs or complexity of card manufacturing when compared to traditional processes.

The term "transaction card," as used herein, may refer to any physical card product that is configured to provide information, such as financial information (e.g., card numbers, account numbers, etc.), quasi-financial information (e.g., rewards balance, discount information, etc.) and/or individual-identifying information (e.g., name, address, etc.), when the card is read by a card reader. Examples of transaction cards include credit cards, debit cards, gift cards, rewards cards, frequent flyer cards, merchant-specific cards, discount cards, identification cards, membership cards, insurance cards, and driver's licenses, but are not limited thereto. For example, disclosed features may be applicable to, for example, key fobs, cellular phone cases and covers, computer interface devices (e.g., keyboard, mouse, etc.), wallets, and/or other articles.

Figure 1:
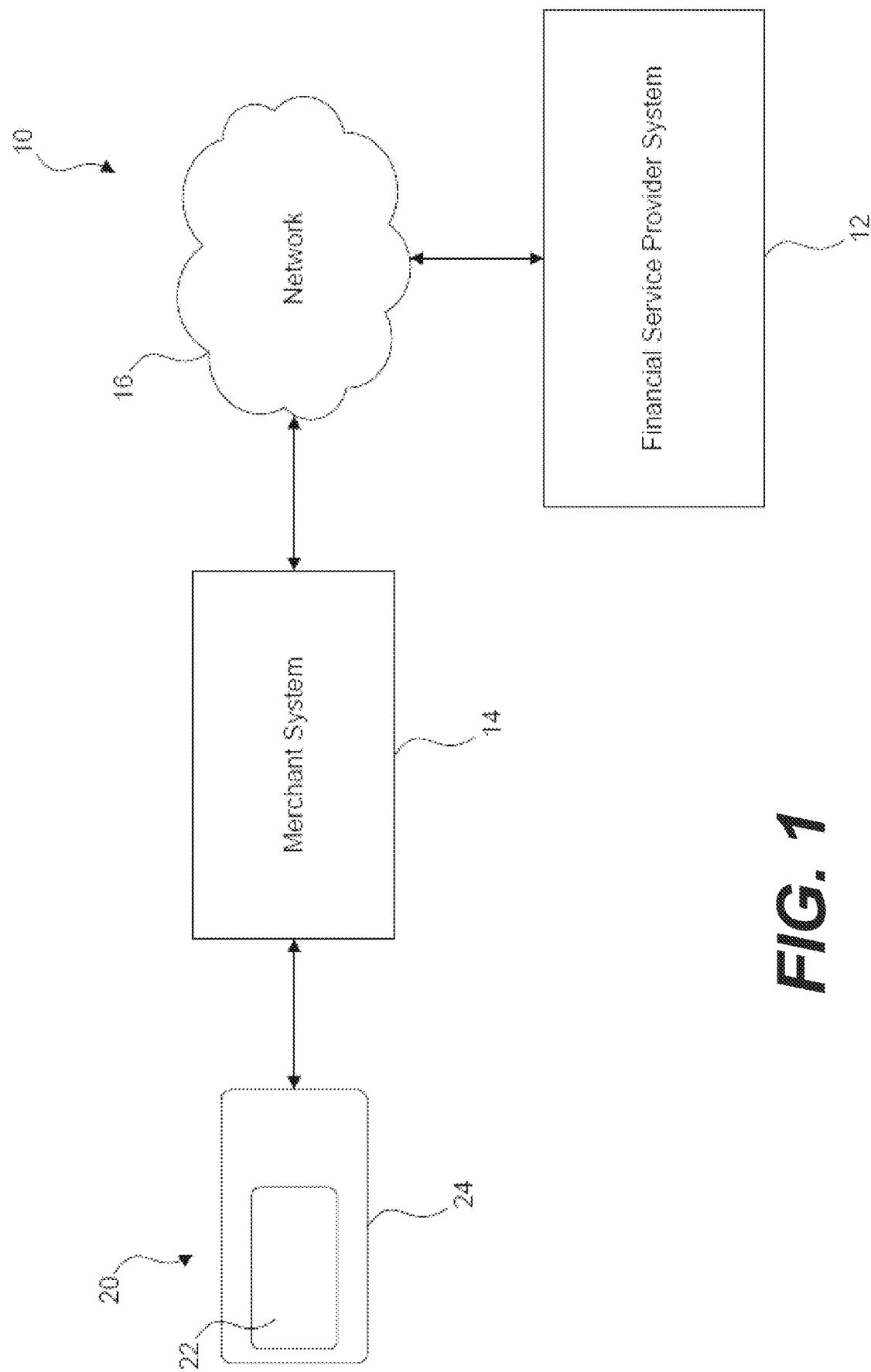
FIG. 1 is a block diagram of an exemplary transaction system, consistent with disclosed embodiments.

FIG. 1 illustrates an exemplary transaction system 10. Transaction system 10 may include a computing system configured to receive and send information between the components of transaction system 10 and with components outside of transaction system 10. Transaction system 10 may include a financial service provider system 12 and a merchant system 14 communicating with each other through a network 16. Transaction system 10 may include additional and/or alternative components.

Financial service provider system 12 may include one or more computer systems associated with an entity that provides financial services. For example, the entity may be a bank, credit union, credit card issuer, or other type of financial service entity that generates, provides, manages, and/or maintains financial service accounts for one or more customers. Financial service accounts may include, for example, credit card accounts, checking accounts, savings accounts, loan accounts, reward accounts, and any other types of financial service accounts. Financial service accounts may be associated with physical financial service transaction cards, such as credit or debit cards that customers use to perform financial service transactions, such as purchasing goods and/or services online or at a point of sale (POS) terminal. Financial service accounts may also be associated with electronic financial products and services, such as a digital wallet or similar account that may be used to perform electronic transactions, such as purchasing goods and/or services online.

Merchant system 14 may include one or more computer systems associated with a merchant. For example, merchant system 14 may be associated with an entity that provides goods and/or services (e.g., a retail store). The merchant may include brick-and-mortar location(s) that a customer may physically visit and where the customer can purchase goods and services using the transaction cards. Such physical locations may include computing devices (e.g., merchant system 14) that perform financial service transactions with customers (e.g., POS terminal(s), kiosks, etc.). Additionally or alternatively, merchant system 14 may be associated with a merchant who provides an electronic shopping environment, such as a website or other online platforms that consumers may access using a computer through browser software, a mobile application, or similar software. Merchant system 14 may include a client device, such as a laptop computer, desktop computer, smart phone, or tablet, which a customer may operate to access the electronic shopping mechanism.

Network 16 may include any type of network configured to facilitate communications and data exchange between components of transaction system 10, such as, for example, financial service provider system 12 and merchant system 14. Network 16 may include a Local Area Network (LAN) or a Wide Area Network (WAN) such as the Internet. Network 16 may be a single network or a combination of networks. Network 16 is not limited to the above examples and transaction system 10 may implement any type of network that allows entities (shown and not shown) of transaction system 10 to exchange data and information.

Transaction system 10 may be configured to conduct a transaction using a transaction card 20. In some embodiments, financial service provider system 12 may provide transaction card 20 to a customer for use in conducting transactions associated with a financial service account held by the customer. For example, the customer may use transaction card 20 at a merchant location to make a purchase. During the course of the purchase, information may be transferred from transaction card 20 to merchant system 14 (e.g., a point of sale device). For example, transaction card 20 may include a transaction device, such as an EMV chip (Europay, MasterCard, Visa), an NFC (near field communication) device, a magnetic stripe (or "mag stripe"), or other type of device configured to store, transmit, send, or receive transaction date. The transaction device may be configured to exchange information with merchant system 14 during the course of a transaction. Merchant system 14 may communicate with financial service provider system 12 via network 16 to verify the information and to complete or deny the transaction. For example, merchant system 14 may receive account information from transaction card 20. Merchant system 14 may transmit the account information and a purchase amount, among other transaction information, to financial service provider system 12. Financial service provider system 12 may settle the transaction by transferring funds from the customer's financial service account to a financial service account associated with the merchant.

While transaction system 10 and transaction card 20 are depicted and described in relation to transactions that involve customers, merchants, and financial service providers, it should be understood that these entities are used only as an example to illustrate one environment in which transaction card 20 may be used. Transaction card 20 is not limited to financial products and may be any physical card product or other type of data storage and/or data transmission device that is configured to store, send, receive, represent, encode, decode, or be indicative of transaction information (or other information, such as identification information, account information, membership information, and the like) when interacting with a corresponding reader device (e.g., a card reader, NFC reader, EMV chip reader, or other media reader). For example, transaction card 20 may be an identification card configured to provide information to a device in order to identify the holder of the card (e.g., driver's license), an insurance card, membership card, a card indicating a licensure (e.g., a driver's license), or the like. Similarly, financial service provider system 12 and merchant system 14 need not relate solely to financial transactions. As non-limiting examples of these systems' non-financial aspects, financial service provider system 12 may administer insurance plan accounts or licensures (e.g., the ability to do something, such as drive an automobile or buy fireworks), and merchant system 14 may read information from transaction card, such as an identity or other information related to the owner/holder of the card.

In some embodiments, transaction card 20 may further include a transaction component 22 disposed on or in a transaction card frame ("card frame") 24. As used herein, a "transaction component" may be one or more devices and/or elements configured to receive, store, process, provide, transfer, send, delete, and/or generate information. For example, transaction component 22 may be a microchip (e.g., EMV chip), a communication device (e.g., Near Field Communication (NFC) antenna, Bluetooth® device, WiFi device), etc. Transaction component 22 may be secured (or affixed, attached) to card frame 24 in such a way that allows card frame 24 to carry transaction component 22 while maintaining a utility of transaction component 22 (e.g., allowing transaction component 22 to interact with merchant system 14). (In some embodiments, transaction component 22 may be non-electronic, such as a magnetic strip, a barcode, Quick Response (QR) code.)

Figure 2:
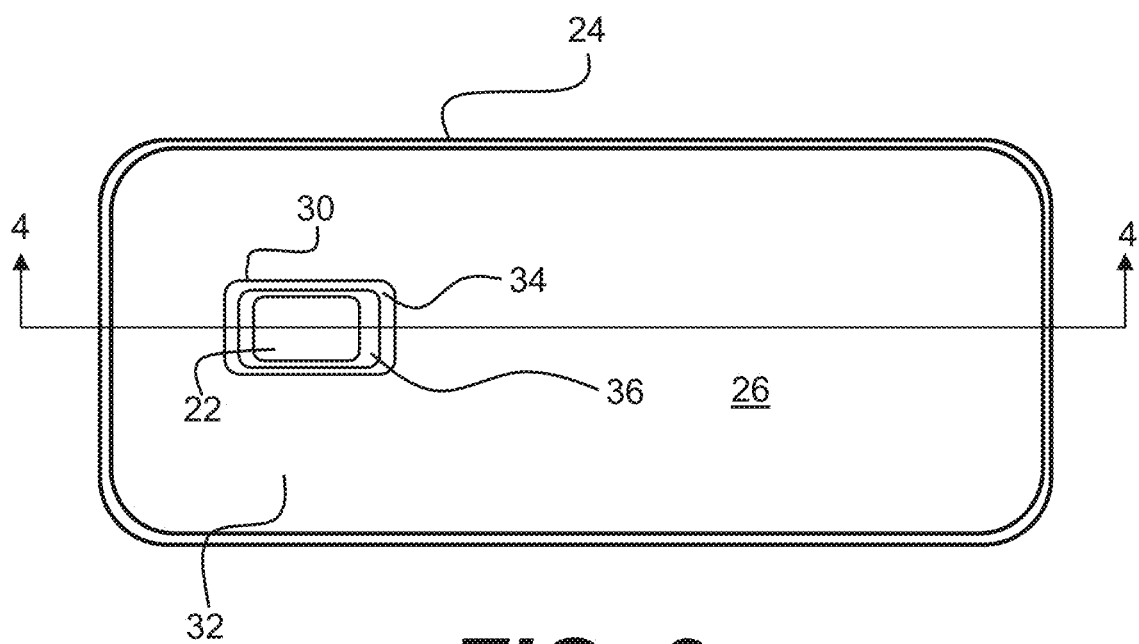
FIG. 2 is a front view of an exemplary transaction card frame, consistent with disclosed embodiments.
Figure 3:
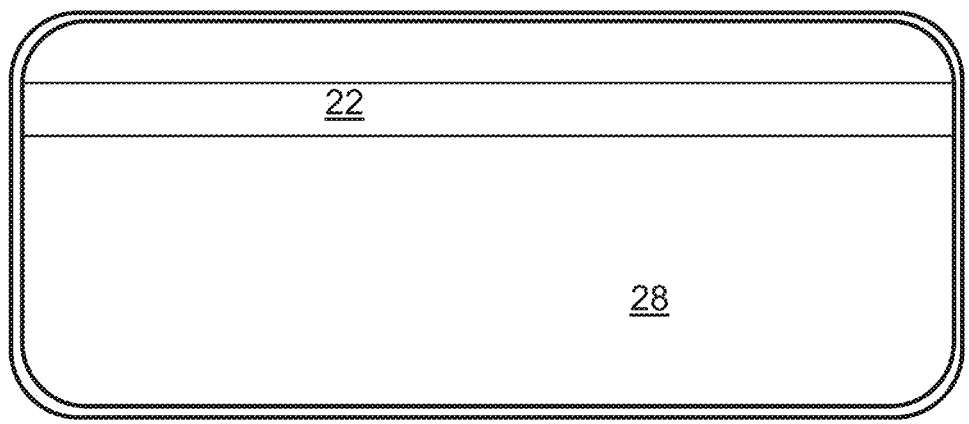
FIG. 3 is a back view of an exemplary transaction card frame, consistent with disclosed embodiments.
Figure 4:
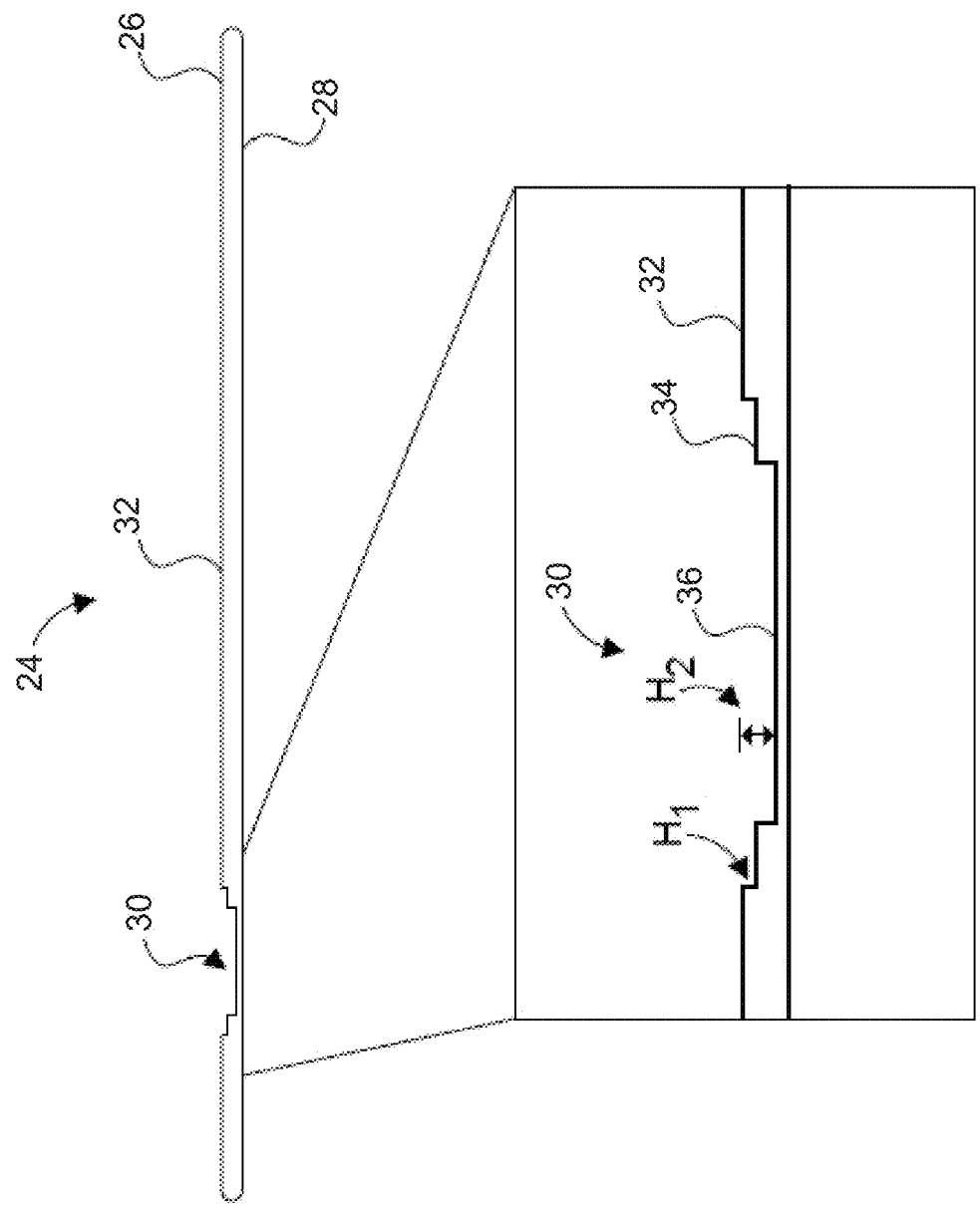
FIG. 4 is a cross-sectional view of the exemplary transaction card frame depicted in FIG. 2, taken along line 4-4, consistent with disclosed embodiments.

FIG. 2 is a front view of an exemplary card frame 24. FIG. 3 is a rear view of card frame 24. FIG. 2 shows a front side 26 of card frame 24 and FIG. 3 shows a rear side 28 of card frame 24. As shown in FIG. 2, card frame 24 may include a pocket 30 configured to accommodate (or receive, affix, or secure) transaction component 22. Pocket 30 may include features that accommodate a particular geometry of transaction component 22 or enable transaction component 22 to be fixed (or secured, affixed, attached, or embedded) to card frame 24. For example, FIG. 4 shows a cross-sectional view of pocket 30 of the exemplary transaction card of FIG. 2 along section line 4-4. The cross-sectional view of pocket 30 shows several surfaces (e.g., surfaces 32, 34, and 36) at varying depths for accommodating transaction component 22, as discussed in further details below.

Card frame 24 may include an upper surface 32 (or first surface 32). Pocket 30 may include a second surface 34 recessed a first depth from first surface 32 of card frame 24. Pocket 30 may also include a third surface 36. Third surface 36 may be recessed a second depth from first surface 32. The second depth may be greater than the first depth. That is, third surface 36 may form a base portion of pocket 30, and second surface 34 may form an elevated surface at a certain height above third surface 36. The dimensions and depths of second surface 34 and third surface 36 may be set based on a plurality of criteria such as the size of a particular transaction component, industry standards, manufacturing tolerances, or other considerations. Based on the geometry of the transaction component to be embedded in pocket 30, pocket 30 may include fewer (e.g., one) or more (e.g., three, four, etc.) surfaces recessed from first surface 32.

For example, in some embodiments, pocket 30 may be configured to accommodate a microchip, such as an EMV chip. In these embodiments, first surface 32 may be referred to as P0. Second surface 34 may be referred to as P1 and used as a glue layer for a contact plate of the EMV chip. Third surface 36 may be referred to as P2 and used as a deeper pocket to accommodate the depth of the EMV chip itself.

FIG. 4 illustrates a cross-sectional view of an exemplary embodiment of card frame 24 shown in FIG. 2 taken along line 4-4. FIG. 4 includes a magnified view of pocket 30 which illustrates surfaces 32, 34, and 36. As shown in the magnified view of pocket 30, second surface 34 is recessed a first depth H1 from first surface 32, and third surface 36 is recessed a second depth H2 from first surface 32. The dimensions (e.g., widths and heights or depths) of surfaces 32, 34, and 36 may vary based on the dimensions of the transaction component. For example, in some embodiments, first depth H1 may be 0.21 mm (with an error tolerance of +/−0.02 mm), and second depth H2 may be 0.62 mm (with an error tolerance of +/−0.02 mm).

Card frame 24 may be manufactured using a molding process, such as an injection molding process or a compression molding process. Although injection molding is discussed in detail as an example of the molding process, some features discussed below may also be applied to the compression molding process.

Figure 5:
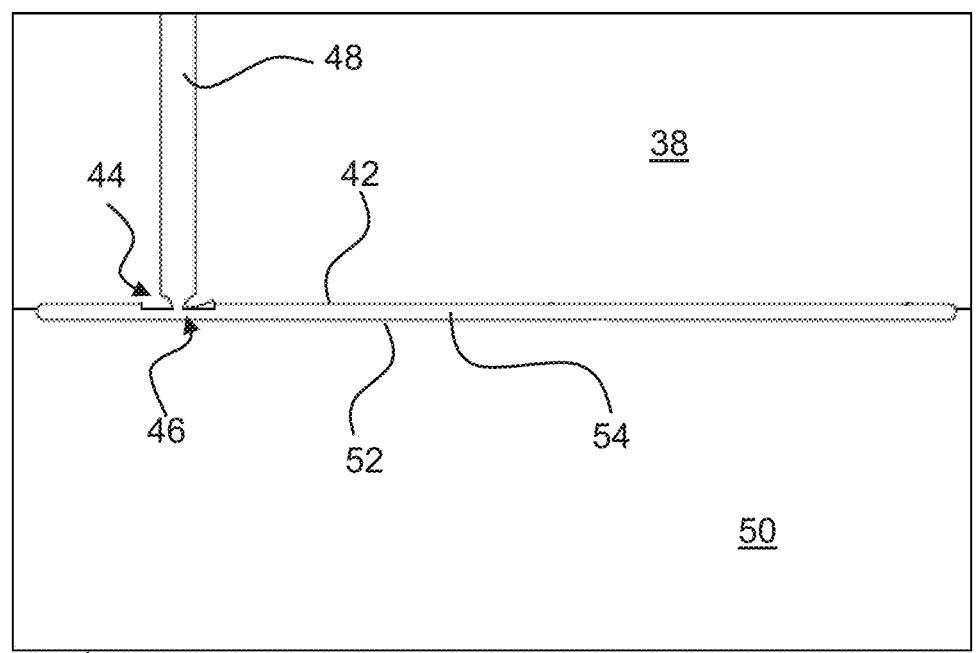
FIG. 5 is a cross-sectional view of an exemplary mold, consistent with disclosed embodiments.

FIG. 5 is a cross-sectional view of an exemplary injection molding setup, which may include of a first plate 38 (or first component) of an exemplary mold 40 for manufacturing card frame 24. Mold 40 may be constructed of any material or materials suitable for use as an injection or compression mold, such as various grades of steel or aluminum. First plate 38 includes a surface 42 that defines first surface 32 of card frame 24. In some embodiments, surface 42 is substantially flat. Surface 42 may include a protrusion structure 44 protruding from the rest of surface 42. Protrusion structure 44 defines the shape and dimension of pocket 30.

First plate 38 may include a gate 46 formed on surface 42. Gate 46 is an opening on surface 42, and is configured to receive a material for forming card frame 24 during the injection molding process. Gate 46 may be connected with a channel 48 extending throughout the thickness of first plate 38. First plate 38 may be configured to join with, connect to, or otherwise abut a second plate 50. Second plate 50 may include a surface 52. Surface 52 may include a shape corresponding to rear side 28 of card frame 24 and may define rear side 28.

Gate 46 may be connected with channel 48 for receiving a material for constructing or forming card frame 24 during a molding process. For instance, during manufacturing, a material for constructing card frame 24 may be heated and injected through channel 48 and gate 46 such that the material fills a cavity 54 between surfaces 42 and 52, thereby forming card frame 24 with pocket 30.

Figure 6:
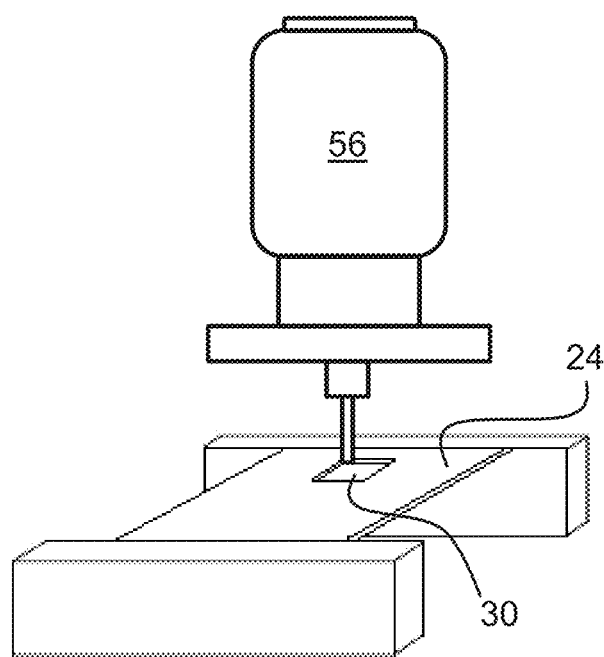
FIG. 6 is an isometric and pictorial view of an exemplary milling setup, consistent with disclosed embodiments.

In some embodiments, card frame 24 may be manufactured using a milling process, such as a computer numerical control (CNC) milling process or another automated, semi-automated, or manual milling process. For example, with reference to FIG. 6, a CNC machine 56 or other type of mill or milling machine may be used to mill card frame 24 from card stock. Card stock may include a sheet or other piece of card material that has been molded, pressed, rolled or otherwise formed from desired materials or ingredients for forming card frame 24. The milling process may also include milling away a space (e.g., pocket 30) of a desired size for accommodating or receiving transaction component 22.

In some embodiments, one or more surfaces of pocket 30 may be formed by a molding process, and one or more surfaces of pocket 30 may be formed by a milling process. For example, one or more of surfaces 32, 34, and 36 (referring to FIG. 4) may be formed during a preliminary molding process, whereas one or more others of surfaces 32, 34, and 36 may be subsequently formed by a milling process after card frame 24 is removed from mold 40. In some embodiments, undesired or excessive materials may be milled away from the interior of the recessed portion. For example, marks, such as those left by a gate or ejection pin may be milled away after the injection molding process is complete. Such defects may be minor such that they are considered acceptable or imperceptible or alternatively may be removed by corrective steps such as sanding, buffing, grinding, or milling.

In other embodiments pocket 30 may be fully formed without additional milling. As an example, mold 40 may produce card frame 24 of appropriate dimensions such that an EMV chip may be affixed within pocket 30 as a next step in a transaction card manufacturing process after removing card frame 24 from mold 40.

To impart a soft touch feel on transaction card 20, card frame 24 may be formed of a material or combination of materials that inherently possesses soft touch qualities after the completion of the manufacturing process. That is, materials used in the injection molding process or materials from which card stock is made for the milling process may be selected such that the resulting card frame 24 possesses a soft touch feel without the subsequent addition of special coatings or laminates designed to impart a soft touch feel. In this way, the process of manufacturing a transaction card with a soft touch feel may be simplified by eliminating manufacturing steps. Additionally, the process of manufacturing a transaction card may be made less expensive by reducing manufacturing time and material costs (e.g., by requiring fewer materials), as compared to known processes of producing a transaction card with a soft touch feel (e.g., spray-on applications).

Additionally, soft touch qualities may impart transaction card 20 with a higher coefficient of friction, which may advantageously reduce instances of transaction card 20 being dropped and, as a result, becoming lost. That is, the soft touch materials disclosed herein may, in addition to providing a desired tactile quality to transaction card 20, increase the coefficient of friction on card surfaces, which may reduce the tendency of transaction card 20 to slip out from between a user's fingers or gloves, for example, when removing transaction card 20 from its storage location (e.g., wallet, purse, pocket, pone case/wallet, etc.) or when inserting and removing transaction card 20 from a card reader (such as one associated with an ATM machine or other transaction device). Additionally, instances of transaction card 20 sliding across a surface, such as a counter, desk, or table, may be reduced, which may reduce instances of inadvertent misplacement of transaction card 20.

In some embodiments, card frame 24 may be formed of a plastic resin. The plastic resin used to form card frame 24 (i.e., the material used during injection molding or to make card stock for milling) may be a mixture of different raw materials and/or different resin mixtures. The components or ingredients of the plastic resin or resin mixture used to form card frame 24 may be selected such that card frame 24 possesses desired soft touch qualities after formation by injection molding and/or milling is complete (i.e., without the performance of additional steps or the application of additional materials).

By forming card frame 24 from a soft touch resin, the soft touch qualities of card frame 24 may not be lost due to wearing (as is the case with spray-on coatings) because the soft touch properties are inherent to the material from which the card frame is made. Further, no additional steps beyond formation by injection molding and/or milling are needed to impart soft touch characteristics, which can reduce the complexity and cost of the manufacturing process. Additionally, by forming card frame 24 from a soft touch resin, the soft touch qualities of card frame 24 may be exhibited on every surface of card frame 24, instead of on only one side or the other (as is the case with current spray-on techniques). By obviating the need for an additional soft touch coating or laminate, forming card frame 24 from a soft touch resin may allow for more precise tolerance control during the injection molding and/or milling processes and may allow for more card stock material to be present, thereby imparting a more substantial feel of the card to the user.

In some embodiments, card frame 24 may be formed of a resin mixture comprising a thermoplastic elastomer (TPE). TPEs may include types of copolymers and/or mixtures of polymers that exhibit properties of thermoplastics and elastomeric materials. For example, the resin mixture used to form card frame 24 may include a polyester elastomer, a block copolymer, a thermoplastic olefin, an elastomeric alloy, a thermoplastic polyurethane, a thermoplastic copolyester, or a thermoplastic polyamide.

In an exemplary embodiment, the resin mixture used to form card frame 24 includes a polyester elastomer, such as a commercially available polyester elastomer. Commercially available polyester elastomers suitable for use in forming card frame 24 with a soft touch feel may include Hytrel® 8238 made by DuPont®. Other suitable polyester elastomers that are commercially available may include Hytrel® 7246 made by DuPont®. While some commercially available TPEs are mentioned specifically herein, other TPEs may be used in various embodiments.

In some embodiments, the TPE used to form card frame 24 may have a Shore A hardness greater than 15, greater than 25, greater than 35, greater than 45, greater than 55, greater than 65, or greater than 75. In some embodiments, the TPE used to form card frame 24 may have a Shore A hardness of less than 85, less than 75, less than 65, less than 55, less than 45, less than 35, or less than 25. As used herein, Shore A hardness may refer to durometer hardness on the Type A durometer scale (i.e., durometer hardness determined using a durometer or micrometer according to the ASTM D2240 Type A durometer configuration). Depending on the selected TPE and/or other materials used in the resin for forming card frame 24, the selected TPE may have a different Shore A hardness, if desired.

In some embodiments, the TPE used to form card frame 24 may have a Shore D hardness less than 85, less than 80, less than 75, less than 70, less than 65, less than 60, or less than 55. In some embodiments, the TPE used to form card frame 24 may have a Shore D hardness of greater than 50, greater than 55, greater than 60, greater than 65, greater than 70, greater than 75, or greater than 80. For example, the TPE used to form card frame 24 may have a Shore D hardness of 70-85. As used herein, Shore D hardness may refer to durometer hardness on the Type D durometer scale (i.e., durometer hardness determined using a durometer or micrometer according to the ASTM D2240 Type D durometer configuration). Depending on the selected TPE and/or other materials used in the resin for forming card frame 24, the selected TPE may have a different Shore D hardness, if desired.

The durometer hardness of a material may relate to or be indicative of a soft touch feel quality of the material. That is, to form card frame 24 having a desired soft touch feel, the TPE may be selected based in part on the durometer hardness (e.g., a hardness value or range of values) associated with the TPE. Thus, the soft touch feel of card frame 24 may be correlated to the durometer hardness of the TPE used therein. For example, a TPE with a low durometer hardness (e.g., a Shore A hardness of less than 15) may impart less of a soft touch feel on card frame 24 than a TPE with a higher durometer hardness (e.g., a Shore A hardness greater than 15 or a Shore D hardness of 70-85).

The durometer hardness of a material may also relate or be indicative of a durability of the material. That is, materials with a higher durometer hardness may be more resistant to wearing (e.g., frictional wearing) than materials having a lower durometer hardness. Thus, in addition to imparting a soft touch feel, transaction cards consistent with embodiments of the present disclosure may experience additional functional improvements tending to prolong the service life and reliability of transaction cards. For example, the durability of a transaction card having a frame formed of a resin that includes a TPE of high durometer hardness (e.g., a Shore A hardness greater than 15 or a Shore D hardness of 70-85) may be used (i.e., swiped, inserted, etc.) more times than a transaction card having a frame formed of a resin that includes a TPE of lower durometer hardness (e.g., a Shore A hardness less than 15). As a result, transaction cards having a coating consistent with embodiments of the present disclosure, by way of their improved durometer hardness, may exhibit improved scratch resistance, reduced wearing of identification features (e.g., customer name, card number, expiration date, etc.), less visible wear over time, enhanced longevity of the transaction component (e.g., a mag stripe), and/or reduced wear experienced during storage (e.g., in a wallet). Additionally, the use of protective coatings and laminates may be foregone, thereby reducing the complexity of the manufacturing process and reducing overall manufacturing costs.

Adding other materials of different durometer hardness to the resin for forming card frame 24 (i.e., mixtures of the TPE with other materials of different durometer hardness) may influence (e.g., raise or lower) the durometer hardness of card frame 24 with respect to the durometer hardness of any one of its constituent materials. For example, other materials, such as acetal homopolymers, polybutylene terephthalate (PBT), and/or other materials may be mixed with a TPE to form the resin for forming card frame 24. Adding other such materials may impart desired mechanical properties on card frame 24 while providing for an enhanced soft touch feel and durability in comparison to known transaction cards and card coatings.

For example, the resin mixture used to form card frame 24 (i.e., a resin mixture including a TPE and/or other materials) may be selected or configured to form a card frame having a Shore D hardness in the range of 20-80. In some embodiments, the Shore D hardness of card frame 24 may be in the range of 20-80, 40-80, 60-80, 60-70, 40-60, 20-60, or 20-40. The transaction card of claim 1, wherein the card frame has a Shore D hardness in the range of 40-60. Depending on the selected TPE and/or other materials used in the resin mixture for forming card frame 24, card frame 24 may have a different Shore D hardness, if desired.

In some embodiments, the TPE used to form card frame 24 may have a flexure modulus in the range of 500-1150 MPa. In this way, the TPE used to form card frame 24 may be relatively flexible in addition to having improved soft touch feel and durability. For example, the TPE used to form card frame 24 may have a flexure modulus greater than 500 MPa, greater than 700 MPa, greater than 900 MPa, or greater than 1100 MPa. In some embodiments, the TPE used to form card frame 24 may have a flexure modulus less than 1150 MPa, less than 950 MPa, less than 750 MPa, less or less than 550 MPa. Depending on the selected TPE and/or other materials used in the resin for forming card frame 24, the selected TPE may have a different flexure modulus, if desired. Thus, in addition to achieving an improved soft touch feel, transaction cards having a coating consistent with embodiments of this disclosure may exhibit greater durability, decreased tendency to crack or fracture when flexed, and greater resiliency to multi-axis flexure. In this way, the service life of transaction cards may be improved, thereby reducing overall costs to manufacturers and consumers, and reducing inconvenient lapses in card availability that occur after card failure and during replacement.

The resin mixture for forming card frame 24 may further include materials for increasing the strength and durability of card frame 24. For example, the resin mixture for forming card frame 24 may include an acetal homopolymer. Acetal homopolymers may include commercially available acetal homopolymers, such as Delrin® made by DuPont®. Other or different commercially available homopolymers may be used, if desired.

The acetal homopolymer used in the resin mixture for forming card frame 24 may have a Rockwell M hardness in the range of 18-94. For example, the acetal homopolymer used in the resin mixture for forming card frame 24 may have a Rockwell M hardness in the range of 18-94, 25-85, 35-75, 45-65, or 50-55. As used herein, Rockwell M hardness may refer to hardness on the Rockwell M scale (i.e., hardness determined using a setup according to the Rockwell M configuration, such as defined by, for example, ASTM D785). Depending on the selected acetal homopolymer and/or other materials used in the resin for forming card frame 24, the selected acetal homopolymer may have a different Rockwell M hardness, if desired.

The acetal homopolymer used in the resin mixture for forming card frame 24 may have a Rockwell R hardness in the range of 102-122. For example, the acetal homopolymer used in the resin mixture for forming card frame 24 may have a Rockwell R hardness in the range of 102-22, 105-120, or 110-115. As used herein, Rockwell R hardness may refer to hardness on the Rockwell R scale (i.e., hardness determined using a setup according to the Rockwell R configuration, such as defined by, for example, ASTM D785). Depending on the selected acetal homopolymer and/or other materials used in the resin for forming card frame 24, the selected acetal homopolymer may have a different Rockwell R hardness, if desired. Enhanced Rockwell hardness may be indicative of improved tensile strength, which may result in cards having reduced failure rates due to impact forces, less visible damage over time, and a greater service life. As a result, fewer replacement cards may be issued, and overall costs to manufacturers (and thus to consumers) may be reduced.

The resin mixture for forming card frame 24 may further include other or additional materials for increasing the strength and durability of card frame 24. For example, the resin mixture for forming card frame 24 may include polybutylene terephthalate (PBT) or be mixed with materials that include PBT. Suitable PBTs or materials that include PBT may include commercially available PBTs, such as Crastin® made by DuPont®. Other or different commercially available PBTs or materials that contain PBT may be used, if desired. As used herein, reference to PBT should be understood to include materials containing PBT.

The PBT used in the resin mixture for forming card frame 24 may have a flexural modulus in the range of 1600-8500 MPa. For example, the PBT used in the resin mixture for forming card frame 24 may have a flexural modulus in the range of 1600-8500 MPa, 2000-8000 MPa, 2500-7500 MPa, 3000-7000 MPA, 3500-6500 MPa, 4000-6000 MPa, 4500-5500 MPa, or 4750-5250 MPa. Depending on the selected PBT and/or other materials used in the resin for forming card frame 24, the selected PBT may have a different flexural modulus, if desired. Thus, transaction cards having a coating consistent with embodiments of this disclosure may exhibit a higher flexural modulus, and thus may be "stiffer," as experienced by customers. In this way, the transaction card may feel more sturdy and durable, which is an important customer achievement from a customer satisfaction point of view. Additionally, the stiffening experienced by cards employing the exemplary disclosed coating may resist flexure, thereby reducing instances in which the card experience high strain and deformation. As a result, the transaction card may resist failure and last longer.

The PBT used in the resin mixture for forming card frame 24 may also have a flexural strength in the range of 50-200 MPa. For example, the PBT used to for card frame 24 may have a flexural strength in the range of 50-200 MPa, 75-175 MPa, 100-150 MPa, or 120-130 MPa. Depending on the selected PBT and/or other materials used in the resin for forming card frame 24, the selected PBT may have a different flexural strength, if desired. Improved flexural strength may increase the amount of tolerated stress and strain before the transaction card fails. Thus, by improving the flexural strength of the card, fewer failures may be experienced due to excessive flexure or bending, which can occur inadvertently or accidentally during normal card use. Further, a higher flexural strength in combination with a higher flexural modulus, as discussed above, may result in compounded reductions in failure due to flexing and bending (i.e., by having greater resistance to bending as well as a higher tolerance for bending and associated forces). Such improvements may prolong the service life of transaction cards and reduce overall costs to manufacturers and consumers, while achieving greater customer satisfaction (i.e., for having reduced failures and associated inconveniences).

The resin mixture for forming card frame 24 may include a mixture of TPE and one or more of acetal homopolymer and PBT. The resin mixture forming card frame 24 may include a mixture having a 50:50 ratio, a 60:40 ratio, a 40:60 ratio, a 70:30 ratio, a 30:70 ratio, or another ratio of TPE to one or more of acetal homopolymer and PBT. The resin mixture for forming card frame 24 may include other or additional materials, if desired.

While illustrative embodiments have been described herein, the scope includes any and all embodiments having equivalent elements, modifications, omissions, combinations (e.g., of aspects across various embodiments), adaptations or alterations based on the present disclosure. For example, in some embodiments, a milling process may be used to form card frame 24 instead of an injection molding or compression molding process. In other embodiments, different types of TPEs than those mentioned herein may be used and or mixed with a PBT, acetal homopolymer, and/or other material. Various ratios of TPE to acetal homopolymer and/or PBT may be tested for soft touch feel, durability, strength, suitability in injection molding, and/or other criteria.

Figure 7:
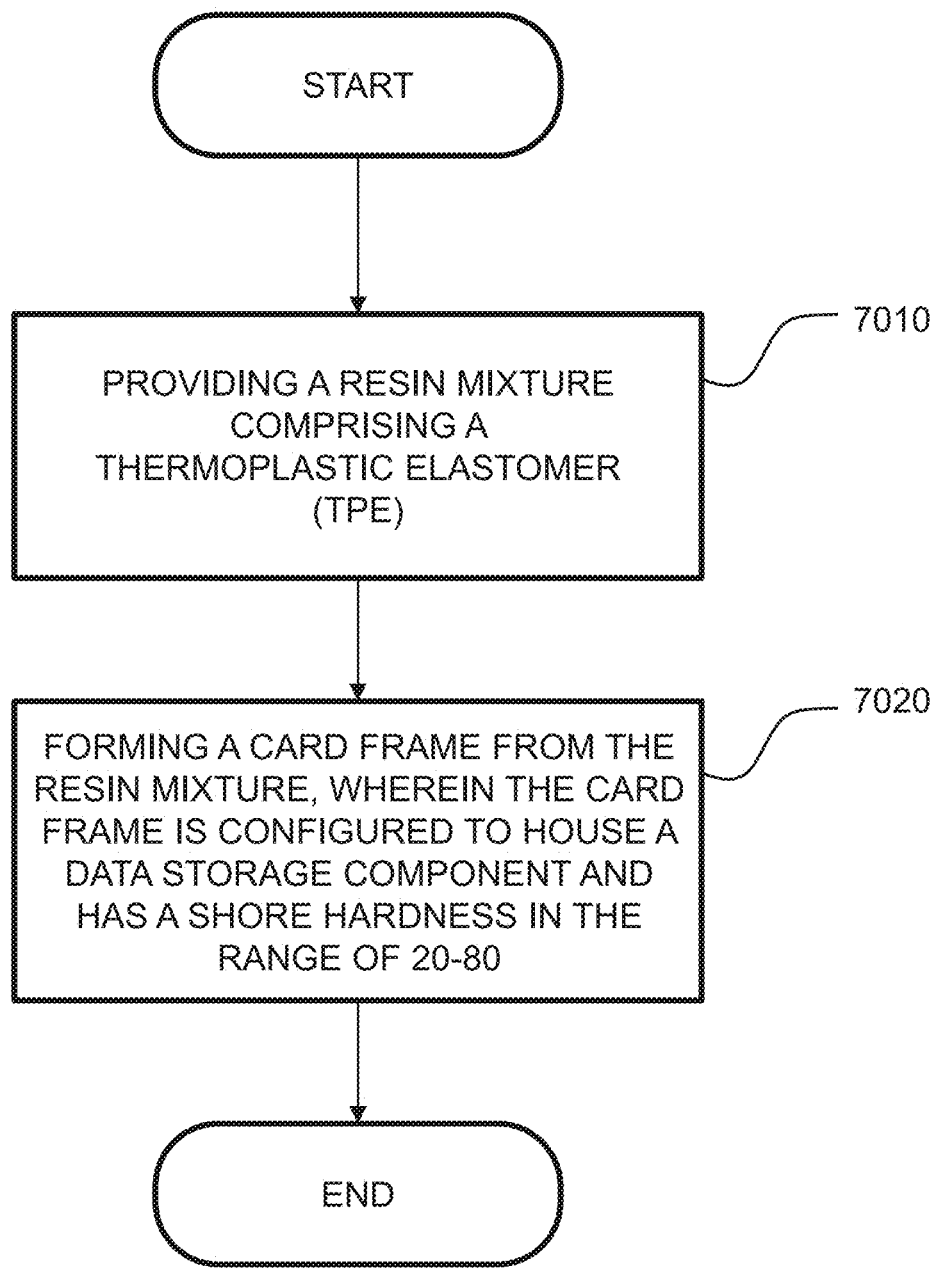
FIG. 7 is a flowchart showing an exemplary method for forming a transaction card, consistent with the disclosed embodiments.

FIG. 7 is a flowchart showing an exemplary method 700 for forming a transaction card. Method 700 may include providing a resin mixture comprising a thermoplastic elastomer (TPE) (Step 7010). The TPE may be a thermoplastic elastomer consistent with embodiments discussed above. For example, the TPE may be a polyester elastomer, such as Hytrel® or another type of TPE. The TPE may have a flexure modulus in the range of 500-1150 MPa. The TPE may also have a Shore A hardness greater than 15 and a Shore D hardness less than 85. For example, the TPE may have a Shore D hardness in the range of 70-85.

Step 7010 of providing a resin mixture may include providing a resin mixture comprising materials for increasing the strength and durability of card frame 24. For example, in addition to TPE, the resin mixture may include acetal homopolymer, PBT, and or other materials. The acetal homopolymer may have a Rockwell M hardness in the range of 18-94 and a Rockwell R hardness in the range of 102-122. The PBT may have a flexural modulus in the range of 1600-8500 MPa and a flexural strength in the range of 50-200 MPa. Other types of acetal homopolymers, PBTs, and/or other materials may be included in the resin mixture, if desired.

Method 700 may further include forming a card frame from the resin mixture, wherein the card frame is configured to house a data storage component and has a Shore D hardness in the range of 20-80 (Step 7020). For example, a resin mixture as described above may be injection molded to form card frame 24. In other embodiments, the resin mixture may be compression molded or extruded. In other embodiments, the resin mixture may be rolled, extruded, or otherwise processed to form sheets of card stock. The card stock may be milled in a CNC, semi-automated, or manual milling process. Features of card frame 24, such as pocket 30 may be formed during the molding process (e.g., the injection molding process) and/or during the milling process.

The elements in the claims are to be interpreted broadly based on the language employed in the claims and not limited to examples described in the present specification or during the prosecution of the application, which examples are to be construed as non-exclusive. It is intended, therefore, that the specification and examples be considered as example only, with a true scope and spirit being indicated by the following claims and their full scope of equivalents.

What is claimed is:

1. A transaction card, comprising:
   a first side;
   a second side, wherein a surface of at least one of the first side or the second side is formed of a resin mixture comprising thermoplastic elastomer (TPE) and at least one of acetal homopolymer or polybutylene terephthalate (PBT), with a ratio of TPE to the at least one of acetal homopolymer or PBT being between 30:70 and 70:30;
   a first transaction component disposed on the first side of the card; and
   a second transaction component disposed on the second side of the card.

2. The transaction card of claim 1, wherein the first transaction component is an electronic transaction component, and the second transaction component is a nonelectronic transaction component.

3. The transaction card of claim 2, wherein the first transaction component comprises at least one of a microchip, a communication device, a Near Field Communication (NFC) device, an antenna, a Bluetooth® device, or a WiFi device.

4. The transaction card of claim 2, wherein the second transaction component comprises at least one of a magnetic strip, a barcode, or a Quick Response (QR) code.

5. The transaction card of claim 1, wherein the ratio of TPE to acetal homopolymer is between 40:60 and 60:40.

6. The transaction card of claim 1, wherein the TPE is a polyester elastomer.

7. The transaction card of claim 1, wherein the TPE has a flexural modulus in the range of 500-1150 MPa.

8. The transaction card of claim 1, wherein the card has a Shore D hardness in the range of 20-80.

9. The transaction card of claim 1, wherein the card has a Shore A hardness greater than 15 and a Shore D hardness less than 85.

10. The transaction card of claim 1, wherein the acetal homopolymer has a Rockwell M hardness in the range of 18-94 and a Rockwell R hardness in the range of 102-122.

11. A method of manufacturing a transaction card, comprising:
    forming a card comprising a first side and a second side, wherein a surface of at least one of the first side or the second side is formed of a resin mixture comprising thermoplastic elastomer (TPE) and at least one of acetal homopolymer or polybutylene terephthalate (PBT), with a ratio of TPE to the at least one of acetal homopolymer or PBT being between 30:70 and 70:30;
    disposing a first transaction component on the first side of the card; and
    disposing a second transaction component on the second side of the card.

12. The method of claim 11, wherein the first transaction component is an electronic transaction component, and the second transaction component is a nonelectronic transaction component.

13. The method of claim 12, wherein the first transaction component comprises at least one of a microchip, a communication device, a Near Field Communication (NFC) device, an antenna, a Bluetooth® device, or a WiFi device.

14. The method of claim 12, wherein the second transaction component comprises at least one of a magnetic strip, a barcode, or a Quick Response (QR) code.

15. The method of claim 11, wherein the ratio of TPE to acetal homopolymer is between 40:60 and 60:40.

16. The method of claim 11, wherein the TPE is a polyester elastomer.

17. The method of claim 11, wherein the TPE has a flexural modulus in the range of 500-1150 MPa.

18. The method of claim 11, wherein the card has a Shore D hardness in the range of 20-80.

19. The method of claim 11, wherein the card has a Shore A hardness greater than 15 and a Shore D hardness less than 85.

20. The method of claim 11, wherein the acetal homopolymer has a Rockwell M hardness in the range of 18-94 and a Rockwell R hardness in the range of 102-122.

* * * * *